Dec. 17, 1968  H. I. GLASER  3,416,906
METHOD AND APPARATUS FOR PROCESSING
HEAT-SOFTENED MINERAL MATERIAL
Filed Feb. 23, 1965
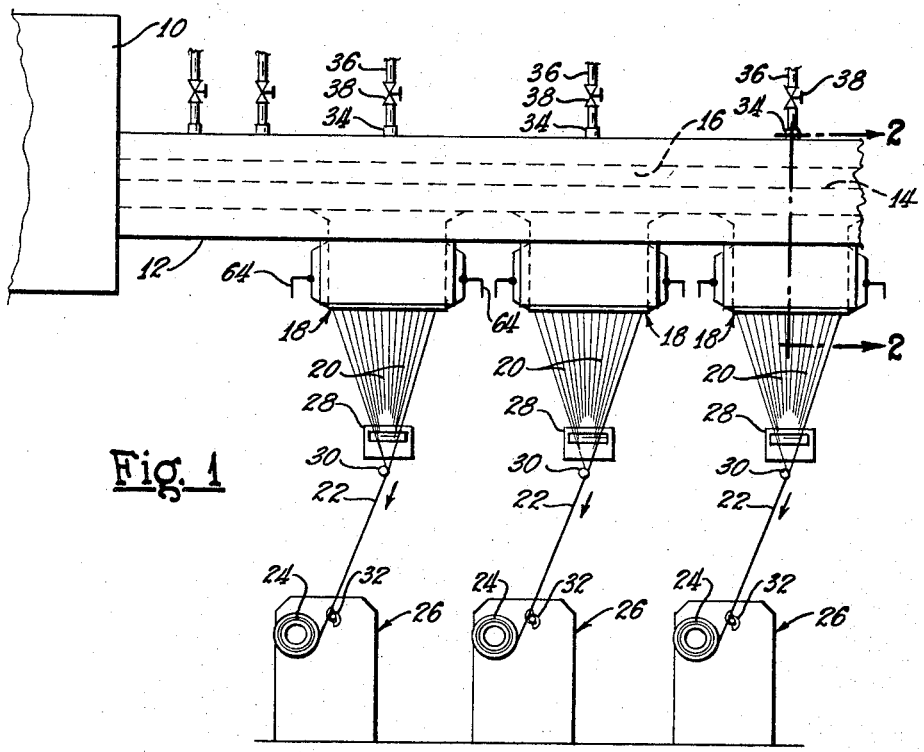
Fig. 1
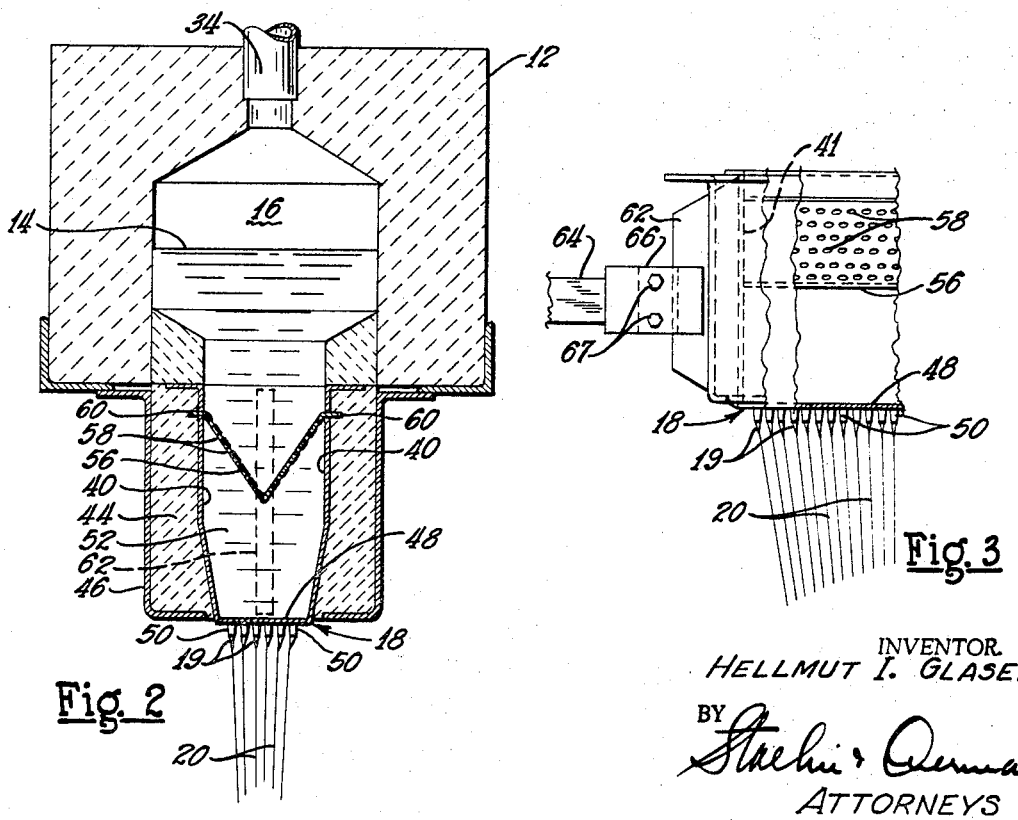
Fig. 2
Fig. 3
INVENTOR.
HELLMUT I. GLASER
BY
ATTORNEYS United States Patent Office 3,416,906
Patented Dec. 17, 1968

3,416,906
METHOD AND APPARATUS FOR PROCESSING
HEAT-SOFTENED MINERAL MATERIAL
Hellmut I. Glaser, Anderson, S.C., assignor to Owens-Corning Fiberglas Corporation, a corporation of Delaware
Filed Feb. 23, 1965, Ser. No. 434,525
12 Claims. (Cl. 65—1)

ABSTRACT OF THE DISCLOSURE

The invention disclosed embraces a method of and apparatus for flowing molten glass along a forehearth channel into stream feeders of substantial depth arranged along the forehearth channel, reheating the glass in each feeder at a region spaced from a stream flow section of the feeder to increase the temperature of the glass at said region above the temperature of the glass in the forehearth channel providing a thermal treatment for the glass in each feeder, and moving the glass away from the reheating region in each feeder and reducing the temperature of the glass as it moves from the reheating region toward the stream flow section.

---

This invention relates to a method of and apparatus for processing heat-softened material, such as glass, and more especially to heat-conditioning of glass for forming attenuated fibers or filaments from the glass.

Several methods have heretofore been employed in processing glass for forming attenuated filaments or fibers. One method involves the steps of melting glass batch in a comparatively large furnace, refining the glass in a refining chamber, and forming the glass into spherical bodies or marbles. The glass marbles are subsequently delivered into a stream feeder or bushing which is electrically heated to remelt the glass to a viscosity at which streams of the glass are flowed through orifices in the bushing and the glass of the streams attenuated to filaments by winding a strand of the filaments on a rotating collector. This method is costly as it involves special apparatus for handling and feeding the glass marbles and requires large amounts of electric energy in remelting the marbles.

Recent developments have been made wherein glass batch is reduced to a molten state and refined in a furnace and the molten glass flowed through a forehearth channel to comparatively shallow stream feeders or bushings disposed along the forehearth and streams of the glass delivered through orifices in the feeders or bushings attenuated to filaments by winding a strand of the filaments upon a rotating collector. The latter process is referred to as a direct melt process. In the direct melt process in the melting and refining of the glass by the application of heat, the temperature of the molten glass is brought to a temperature that is comparatively high in order to effect refining of the glass. During this processing of melting and refining the glass, gases and volatiles are emitted or driven off from the melt. This action of melting and refining the glass at elevated temperatures renders the glass substantially stable for any temperature less than the maximum melt temperature in the furnace. Heretofore, in the direct melt process, the temperatures of the glass in the forehearth channel and the shallow stream feeders or bushings are substantially lower than the temperature of the melt in the furnace. Furthermore, thermal physical and chemical inhomogeneities exist in the mass flow or transport of the glass in the forehearth channel through heat losses at the refractory sides and floor of the channel and tending to contaminate the glass with refractory cords. Frequent filament breakouts, formation of nonuniform filaments and other difficulties have been encountered which are believed to be attributable at least in part to such inhomogeneities existent in bushings or stream feeders disposed along a forehearth and supplied with glass from the forehearth channel.

With comparatively shallow stream feeders or bushings conventionally used along a forehearth channel, temperature upsets and inhomogeneities of the glass cannot be adequately corrected or abated in the comparatively short time that the glass is resident in the feeder or bushing.

It has been found that through the method of the present invention of reheating the glass to substantially increased temperatures in the stream feeders or bushings that such inhomogeneities are substantially eliminated and that the stability of the glass is not impaired at temperatures up to the maximum original melting and refining temperature. It is found that controlled heat treatment of the glass in a stream feeder or bushing of substantial depth for a period of time reconditions and homogenizes the glass as well as stabilizing the temperature in each bushing so that filaments formed from glass streams from the several bushings are more uniform and have improved strength characteristics with a marked reduction in the number of filament breakouts.

The invention embraces a method of flowing refined glass from a melting and refining zone directly to a stream feeder or bushing and reheating the glass in the stream feeder or bushing to a temperature approaching but not exceeding the maximum original melt temperature whereby "reboiling" of the glass is avoided and filaments or fibers of improved strength characteristics are derived from attenuation of streams of the heat-conditioned glass.

Another object of the invention resides in a method of applying heat to glass in stream feeders or bushings arranged along a forehearth channel whereby the glass in each bushing is elevated in temperature at a region in the feeder spaced above the orifice or stream flow section of the feeder providing a thermal treatment for the glass, the heat being applied in a manner whereby the temperature of the glass in each of the bushings is progressively reduced as the glass moves from a maximum temperature zone toward the stream flow section to provide a desired attenuating temperature.

Another object of the invention embraces an arrangement of bushings along a forehearth wherein each bushing is of substantial depth and heat applied to the glass in each bushing at a zone preferably above the median or midregion of each bushing to substantially increase the temperature of the glass at said zone so as to thermally condition the glass, each bushing being of a depth to promote a temperature profile involving a progressive reduction in the temperature of the glass during its travel from the heated zone to the stream discharge section.

Another object of the invention resides in a method of imparting a heat treatment to glass in stream feeders or bushings arranged along a forehearth channel elevating the temperature of the glass in each feeder or bushing substantially above the temperature of the glass in the forehearth channel to approach a more perfect solution of glass, both physically and chemically, to condition the glass in each bushing to a more homogeneous state preparatory to the delivery of streams of glass from the feeders for attenuation to filaments.

Another object of the invention resides in a method of imparting a thermal treatment to glass or other fiber-forming materials in a localized region of a bushing and controlling the temperature profile of the glass throughout its depth in the bushing to provide at the stream discharge region a proper viscosity for the formation of filaments or fibers, the effect of the thermal treatment being to improve the tensile strength and thereby minimize filament breakouts.

Another object of the invention embraces a method involving reheating the glass in stream feeders or bushings arranged along a forehearth whereby to attain beneficial thermal conditioning of the glass in each bushing without causing "reboiling" of the glass in the bushings.

Another object of the invention resides in a stream feeder or bushing of substantial depth adapted to be heated electrically, the bushing including terminals or connecting lugs at its ends of a shape to facilitate a controlled temperature profile for the glass in the bushing, and by reason of the increased head or depth of glass in the bushing, the orifices in the projections or tips of the stream discharge section of the feeder or bushing may be reduced in size to provide fine streams to facilitate attenuation of the streams to finer filaments.

Another object of the invention is the provision of a comparatively narrow bushing heated in a manner providing a thermal or heat conditioning at increased temperature of each incremental part of the glass moving through the bushing to promote laminar flow, the elimination of seeds and improved homogeneity of the glass.

Another object of the invention is the provision of a comparatively deep, narrow bushing whereby a higher ratio of heat transmission to the glass is effected as a higher bushing surface area to glass volume ratio is attained over prior bushing constructions.

Further objects and advantages are within the scope of this invention such as relate to the arrangement, operation and function of the related elements of the structure, to various details of construction and to combinations of parts, elements per se, and to economics of manufacture and numerous other features as will be apparent from a consideration of the specification and drawing of a form of the invention, which may be preferred, in which:

FIGURE 1 is a semi-schematic elevational view of a forehearth and multiple bushing arrangement for carrying out the method of the invention;

FIGURE 2 is a vertical sectional view taken substantially on the line 2—2 of FIGURE 1, and FIGURE 3 is a fragmentary longitudinal sectional view illustrating an arrangement for heating glass in a region of a bushing imparting a thermal treatment to the glass.

While the method and apparatus of the invention have particular utility in conditioning glass for forming fibers or filaments from streams of the conditioned glass, it is to be understood that the method of thermal conditioning heat-softened material in a bushing may be employed for conditioning glass or other materials for various purposes.

Referring to the drawings in detail, FIGURE 1 is a semi-schematic elevational view illustrating a forehearth construction of a direct melt system for supplying heat-softened glass to a plurality of stream feeders or bushings of the invention associated with the forehearth. The glass batch is introduced into a melting and refining furnace or tank 10 at an end region of the tank opposite the forehearth 12, the latter being connected with the melting and refining furnace 10 in a conventional manner.

The glass batch is reduced by heat to a flowable or molten condition in the furnace 10 and the molten glass is traversed through the furnace 10 in a manner to effect a refining of the glass, the refined glass 14 being delivered from the furnace into a forehearth channel 16 lengthwise of the forehearth. The glass is processed to render it particularly suitable for attenuation to fine continuous filaments or fibers. Spaced lengthwise along the forehearth 12 are stream feeders or bushings 18. The floor or tip section of each feeder or bushing is provided with orifice means through which flow streams 19 of glass conditioned through the method of the invention and the streams attenuated to filaments 20 by winding a strand 22 of the filaments upon a rotating collector 24 of a winding machine 26 of conventional construction, there being a winding apparatus for the strand of filaments derived from each feeder or bushing. An applicator 28 may be provided for each group of filaments for delivering binder or coating materail onto each group of filaments. The filaments of each group are converged into a strand by a gathering shoe 30.

During winding of the strand 22 on a collector 24, a rotatable and reciprocable traverse means 32 engages the strand for distributing the strand lengthwise on the collector 24 to form a package. The traverse 32 is of a configuration whereby rotation of the traverse oscillates the strand 22 to cause the individual wraps or convolutions of strand to be collected on the collector in crossing relation in a conventional manner.

The glass in the forehearth is maintained in flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

As illustrated in FIGURE 2, each bushing 18 is inclusive of substantially vertical side walls 40 and end walls 41 fashioned of an alloy of platinum and rhodium or other suitable metallic material capable of withstanding the high temperatures of molten glass and of corrosion resistant characteristics.

Each bushing is embraced by refractory insulation 44 supported by a metal casing 46 secured to the forehearth construction 12 in any suitable manner. The floor or tip section 48 of the feeder is fashioned with a group of depending projections or tips 50 each tip being tubular providing an orifice through which flows a stream 19 of glass.

The bushing chamber 52 defined by the side walls 40 and end walls 41 of the feeder is of greater depth than heretofore used, the depth being substantially greater than the width of the chamber. The chamber 52 provides a comparatively deep, narrow well in which the glass is given a thermal treatment in a manner hereinafter explained. Extending lengthwise in the upper region of the chamber 52 preferably above the mid region of the stream feeder or bushing is a heater member 56 preferably in the form of a screen or strip having perforations 58 to accommodate glass flow therethrough.

In the embodiment illustrated in FIGURES 2 and 3 the heater strip 56, formed of an alloy of platinum and rhodium, is of V-shaped construction having flanges 60 at its upper edge regions joined with the side walls 40 of the bushing, the ends of the strip being joined with the end walls 41. While the V-shaped configuration for the heater member 56 is preferred in order to provide substantial surface area for direct heat-transferring contact with the glass, it is to be understood that other configurations of heater strip may be used if desired.

Integrally formed with each end wall 41 of the bushing is a terminal or terminal lug 62 preferably of rectangular cross section and of uniform thickness throughout its vertical dimension as shown in broken lines in FIGURE 2. Current is supplied to each terminal 62 through a bus bar or conductor 64 connected with a current supply of comparatively high amperage and low voltage. Each bus bar 64 is provided with a clamp 66 for direct engagement with a terminal 62, the clamp 66 being provided with clamping bolts 67 to facilitate adjustment of the clamp vertically of a terminal 62 to control or vary current distribution through the walls of the bushing and the heater member or strip 56.

The invention embraces heating and temperature control of the glass from the melting region of the furnace to the delivery of streams of glass 19 from the deep well bushing 18. An important feature of the method involves substantial reheating of the glass in each bushing providing a thermal treatment which treatment results in higher strength fibers or filaments and in other advantages. In the melting and refining of the glass batch in the combined melting and refining furnace 10, the melt is raised to a comparatively high temperature substantially above the fusion temperature for providing improved homogeneous glass.

The molten glass at a high temperature in the furnace emits gases and volatiles and seeds in the glass are dissolved. The extent of freeing the molten glass in the furnace of gases, volatiles and seeds depends in a measure upon the maximum temperature at which the glass is processed in the furnace.

If the molten glass is increased in temperature above the maximum melt temperature, the higher temperature promotes further emission of gases and volatiles, a condition referred to as "reboiling." Hence, the higher the temperature of the melt in the furnace, the more gases and volatiles that are driven off.

A high degree of homogeneity of uncontaminated glass is imperative in processing glass into fine textile filaments or fibers. However, practical considerations make it uneconomical to raise the temperature of the glass in the furnace too high because of the amount of additional heat involved and at extremely high temperatures the refractory lining of the furnace tends to deteriorate and particles of the refractory lining erode into the glass, contaminating the glass and impairing its suitability for attenuation to fine filaments. Thus it is advisable for economical commercial operations to limit the maximum melt temperature to about 2900° F. or less.

Heretofore, in utilizing molten glass for forming attenuated fibers or filaments, the glass through heat losses is reduced to a substantially lower temperature in the forehearth but maintained in a flowable state. In prior processes, the glass at reduced temperature flows into shallow or plate-like bushings or stream feeders along a forehearth and usually heat is applied to the glass in a bushing by electric current to retard further heat losses for stabilizing the glass at an attenuating temperature without increasing the glass temperature in the bushing.

In the method of the present invention, electric energy is supplied to the deep well bushing and a heater strip under controlled distribution for the purpose of substantially increasing the temperature of or reheating the glass in an upper region of the bushing to impart a thermal treatment to the glass, which method derives advantages over prior processes. The temperature of the glass in the forehearth channel is substantially reduced from the temperature of the melt in the furnace, for example, to a temperature range of approximately 2200° F. to 2300° F. and such temperature range is maintained through the heat from the burners 38.

Thermal differentials exist in the cross sectional profile of the glass in the forehearth channel. The heat from the burners 38 results in the temperature at the central region being higher than the temperature of the glass along the refractory sides and floor of the forehearth where normal heat losses occur. There is a tendency for refractory cords to form in the glass moving along the refractory lining of the channel impairing the physical and chemical characteristics of the glass. The glass in each bushing is increased in temperature or reheated by the electric energy flowing through the heating member or screen 56. The glass is heated adjacent the heater screen to a temperature substantially above the temperature of the glass in the forehearth channel and preferably to a temperature approaching but not exceeding the maximum temperature of the melt in the melting or refining furnace 10. The thermal heat treatment of the glass in each of the bushings at a temperature approaching but preferably not exceeding the maximum temperature of the melt in the melting and refining furnace 10 tends to produce a more perfect solution of glass as to both physical and chemical characteristics. It is found that if the temperature of the glass in a bushing is increased above the maximum melt temperature in the furnace, further gasification or "reboiling" occurs which disturbs the stability of the glass and weakens the cones of glass at the orifices making the glass less stable to the attenuating forces.

It is found that the heater screen 56 should preferably be disposed above a median or mid region of the bushing and the heating controlled so that the temperature of the glass adjacent the heater strip 56 in the bushing does not exceed the original melt temperature. The glass flowing downwardly in the bushing, by reason of the discharge of the glass as streams 19 from the tip section, is progressively reduced in temperature and laminar flow maintained whereby the glass adjacent the bushing floor or tip section 48 is at a proper attenuating temperature for delivery through the orificed projections 50.

The thermal treatment imparted to the glass in the upper region of the deep well bushing and the use of a deep well bushing of comparatively narrow width attains several advantages and improved operation and attenuation of the glass to filaments. The bushing of substantial depth provides an increased head of glass in the bushing, enabling reduction in size of the orifices in the projections 50 resulting in finer glass streams delivered from the bushing facilitating the formation or attenuation of finer filaments.

It is found that the increased head of glass in conjunction with the thermal treatment reduces the attenuating tension on the filaments 20 drawn from the glass streams and reduces the tendency for filament breakouts to occur.

The thermal treatment or temperature increase in the upper region of the bushing results in filaments having increased tensile strength as compared with filaments drawn from streams from a shallow bushing without the thermal treatment of the present process.

The glass subjected to the thermal treatment in the deep bushing is of improved homogeneity. When the temperature is reduced from the maximum melting temperature in the furnace to the temperature maintained in the forehearth channel, there is a tendency for seeds to form which are dissolved by the thermal treatment in the bushing.

The comparatively narrow, deep bushing performs another important function in that the glass has a residence time in the bushing effective to promote uniformity in temperature in transverse planes and provides for a decreasing temperature gradient downwardly from the thermal treatment region to the stream delivery region. The bushing 18 is fashioned of metallic material, such as an alloy of platinum and rhodium so that the glass in the bushing at increased temperature is not contaminated by erosion of refractory.

The terminal clamps 66 may be adjusted vertically with respect to the terminal lugs 62 on each bushing to control heat distribution by controlling the distribution of electric energy to the heater strip 56 and the side walls of the bushing.

By such adjustment the temperature of the glass adjacent the heater strip may be regulated and this regulation modifies the temperature of the glass adjacent the floor 48 of the bushing. Through the control of the amount of current to a bushing and its distribution, the temperature of the glass adjacent the bushing floor 48 may be controlled to attain a viscosity of the glass at the region of discharge to promote efficient attenuation of the glass to filaments.

It has been found that for the average glass stream delivery capacity for forming filaments for textile purposes, a bushing of a depth of approximately six inches and of a width of from one-half to two-thirds of its depth provides for adequate thermal treatment in the upper region of the bushing and a desired temperature profile in conditioning the glass whereby filaments formed from the thermally treated glass have improved strength characteristics.

The method of increasing the temperature of the glass in a localized region in each bushing substantially compensates for temperature upsets or temperature variations in the glass throughout the forehearth channel and eliminates adverse effects of any differences in temperature of the glass as delivered to the successive bushings along the forehearth. The depth of glass in the bushing provides sufficient residence time for the reheated glass to fully compensate for temperature variations of the glass at the region of flow of the glass from the forehearth channel into the several bushings.

It is apparent that, within the scope of the invention, modifications and different arrangements may be made other than as herein disclosed, and the present disclosure is illustrative merely, the invention comprehending all variations thereof.

I claim:

1. The method of processing heat-softened glass including flowing the glass along a horizontal channel, flowing the glass from the channel downwardly into a bushing, heating the glass in an upper region of the bushing to a temperature above that of the glass in the channel to impart a thermal treatment to the glass in the bushing, flowing the glass downwardly from the upper region and reducing the temperature of the glass as it moves downwardly from the thermal treatment region, and flowing streams of the glass through orifices in the floor of the bushing.

2. The method of processing heat-softenable fiber-forming mineral material including reducing batch material by the application of heat to a molten condition in a chamber, flowing the molten material from the chamber along a channel, flowing the molten material from the channel into a stream feeder, reheating the molten material above a mid-region in the feeder to a temperature approaching but not exceeding the maximum temperature of the molten material in the chamber, and reducing the temperature of the reheated material below the reheating region in the stream feeder to increase the viscosity thereof preparatory to the discharge of the material through orifices in the stream feeder.

3. The method of processing heat-softenable fiber-forming mineral material including reducing batch material by the application of heat to a molten condition in a chamber, flowing the molten material from the chamber along a channel at a temperature lower than that of the molten material in the chamber, flowing the molten material from the channel into a stream feeder, heating the material adjacent a mid-region in the feeder to a temperature approaching but not exceeding the maximum temperature of the molten material in the chamber to impart a thermal treatment to the material, and reducing the temperature of the thermally treated material below the mid region to increase the viscosity thereof preparatory to discharge of the material through orifices in the stream feeder.

4. The method of processing glass including reducing glass batch by the application of heat to a molten condition in a chamber, flowing the molten glass from the chamber along a channel at a temperature lower than that of the glass in the chamber, flowing the molten glass from the channel into a stream feeder, flowing electric current through a metal body in an upper region of the feeder to reheat the glass in said region to a temperature approaching but not exceeding the maximum temperature of the molten glass in the chamber, moving the glass downwardly from said region, gradually reducing the temperature of the glass as it moves downwardly away from the body in the stream feeder to increase the viscosity thereof, and flowing the glass of increased viscosity through orifices in the stream feeder.

5. The method of processing glass including heating glass batch in a chamber to reduce the batch to a molten condition, flowing the molten glass from the chamber along a forehearth channel, reducing the temperature of the glass in the channel below that of the molten glass in the chamber, flowing the molten glass from the channel into a stream feeder of substantial depth and of a width of from one-half to two-thirds of its depth, reheating the glass in an upper region of the feeder to a temperature approaching but not exceeding the maximum temperature of the glass in the chamber, and flowing streams of the reheated glass through orifices in the feeder.

6. The method of processing heat-softenable glass including reducing batch by the application of heat to a molten state and refining the molten glass in a chamber, flowing the refined glass from the chamber along a forehearth channel, reducing the temperature of the glass in the channel below the maximum temperature of the glass in the chamber, flowing the glass from the channel into a bushing of substantial depth and of a width of from one-half to two-thirds of its depth, directing electric energy through the glass in an upper region of the bushing to reheat the glass in said region to a temperature approaching but not exceeding the maximum temperature of the glass in the melting and refining chamber, reducing the temperature of the glass during its movement from the reheating region toward a stream delivery region, and discharging streams of the glass from orifices in the floor of the bushing.

7. The method of processing heat-softenable glass including reducing glass batch by the application of heat to a molten state and refining the molten glass in a furnace, flowing the refined glass from the furnace along a forehearth channel at a temperature substantially below the maximum temperature of the glass in the chamber, flowing the glass from the channel into a bushing of substantial depth and of a width of from one-half to two-thirds of its depth, flowing electric current through a metal body in an upper region of the bushing to reheat the glass in said region to a temperature approaching but not exceeding the maximum temperature of the glass in the melting and refining furnace, moving the glass downwardly from said reheating region, progressively reducing the temperature of the glass during its movement away from the reheated region, flowing streams of the glass from orifices in the bushing, and attenuating the glass of the streams to fibers.

8. The method of processing heat-softenable glass including reducing glass batch by the application of heat to a molten state and refining the molten glass in a furnace, flowing the refined glass from the furnace along a forehearth channel at a temperature substantially below the maximum temperature of the glass in the chamber, flowing the glass from the channel into a bushing, reheating the glass in an upper region of the bushing to a temperature above the temperature of the glass in the forehearth channel but below the maximum temperature of the glass in the melting and refining furnace, flowing the glass downwardly from the upper region and reducing the temperature of the glass as it moves away from said region, and discharging streams of the glass from orifices in the floor of the bushing.

9. Apparatus for processing heat-softenable mineral material including, in combination, forehearth means providing a substantially horizontal flow channel containing heat-softened mineral material in a flowable state, a stream feeder disposed beneath and secured to the forehearth means, said feeder having end walls a flow passage in said forehearth means for delivering material from the channel into the stream feeder, the feeder being of substantial depth and of a width of from one-half to two-thirds of its depth, the floor of the feeder having a plurality of orifices through which streams of material are delivered from the feeder, a perforated current conducting member disposed in an upper zone of the feeder connected with the end walls of the feeder, terminal elements provided at the respective ends of the feeder, said terminal elements being disposed vertically and being of substantially uniform thickness throughout their height, clamp means for connecting a current supply conductor to each terminal element, each of said clamp means being adjustable along each terminal element to vary the distribution of current flow through the feeder and perforated current conducting member to provide increased heating of the material in the zone of the member and control the temperature of the material in said upper zone.

10. Apparatus for processing heat-softened glass including, in combination, forehearth means providing a substantially horizontal flow channel containing heat-softened glass in a flowable state, a stream feeder of metallic material disposed beneath and secured to the forehearth means, said feeder having end walls, a flow passage in said forehearth means for delivering material from the channel into the stream feeder, the feeder being of substantial depth and a width of from one-half to two-thirds of its depth, the floor of the feeder having a plurality of orifices through which streams of material are delivered from the feeder, a perforated current conducting member disposed lengthwise of the feeder at a zone above the mid region of the feeder and connected with the end walls of the feeder, terminal elements provided at the respective ends of the feeder, said terminal elements being disposed vertically, clamp means for connecting a current supply conductor to each terminal element, each of said clamp means being adjustable along the adjacent terminal element to vary the distribution of current flow through the feeder and perforated current conducting member to provide increased heating of the material in the zone of the perforated member to increase substantially the temperature of the material in said zone.

11. Apparatus for processing heat-softened glass including, in combination, forehearth means providing a substantially horizontal flow channel containing heat-softened glass in a flowable state, an elongated stream feeder disposed beneath and secured to the forehearth means, a flow passage in said forehearth means for delivering material from the channel into the stream feeder, the feeder being of a depth of approximately six inches and of a width of from one-half to two-thirds of its depth, the floor of the feeder having a plurality of orifices through which streams of material are delivered from the feeder, a perforated current conducting heater strip disposed lengthwise of the feeder at a zone above the mid region of the feeder and secured to the end walls of the feeder, terminal elements provided at the respective ends of the feeder, said terminal elements being disposed vertically, and clamp means connecting a current supply conductor to each terminal element providing electric current flow through the feeder and perforated current conducting member to provide increased heating of the material in the zone of the perforated member to impart a thermal treatment to the glass in said zone, said clamp means being adjustable along the terminal elements to vary the distribution of current flow through the feeder and through the perforated current conducting heater strip.

12. The method of processing heat-softenable glass including reducing glass batch by the application of heat to a molten state and refining the molten glass in a furnace, flowing the refined glass from the furnace along a forehearth channel at a temperature below the maximum temperature of the glass in the furnace, flowing the glass from the channel into a feeder, reheating the glass in the upper region of the feeder to a temperature above the temperature of the glass in the forehearth channel, and flowing the reheated glass through an orifice in the feeder.

References Cited

UNITED STATES PATENTS

| | | | |
|---|---|---|---|
| 3,264,076 | 8/1966 | Veazie et al. | 65—2 |
| 3,269,820 | 8/1966 | Day et al. | 65—136 |

DONALL H. SYLVESTER, *Primary Examiner.*

R. L. LINDSAY, *Assistant Examiner.*

U.S. Cl. X.R.

65—2, 11, 136, 326, 346, 356